Feb. 18, 1947.   J. W. LATCHUM, JR   2,416,011
RECOVERY OF SULPHUR DIOXIDE-FREE HYDROCHLORIC
ACID FROM ALUMINUM CHLORIDE SLUDGE
Filed Jan. 3, 1944   2 Sheets-Sheet 1

INVENTOR
J. W. LATCHUM, JR.
BY Hudson, Young and Yinger
ATTORNEYS

Feb. 18, 1947.                J. W. LATCHUM, JR                2,416,011
              RECOVERY OF SULPHUR DIOXIDE-FREE HYDROCHLORIC
                     ACID FROM ALUMINUM CHLORIDE SLUDGE
                        Filed Jan. 3, 1944           2 Sheets-Sheet 2
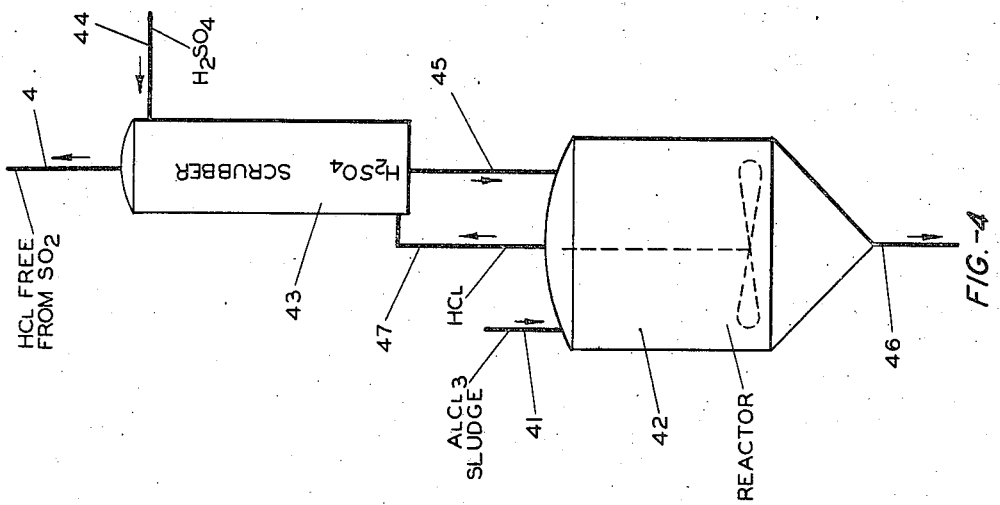
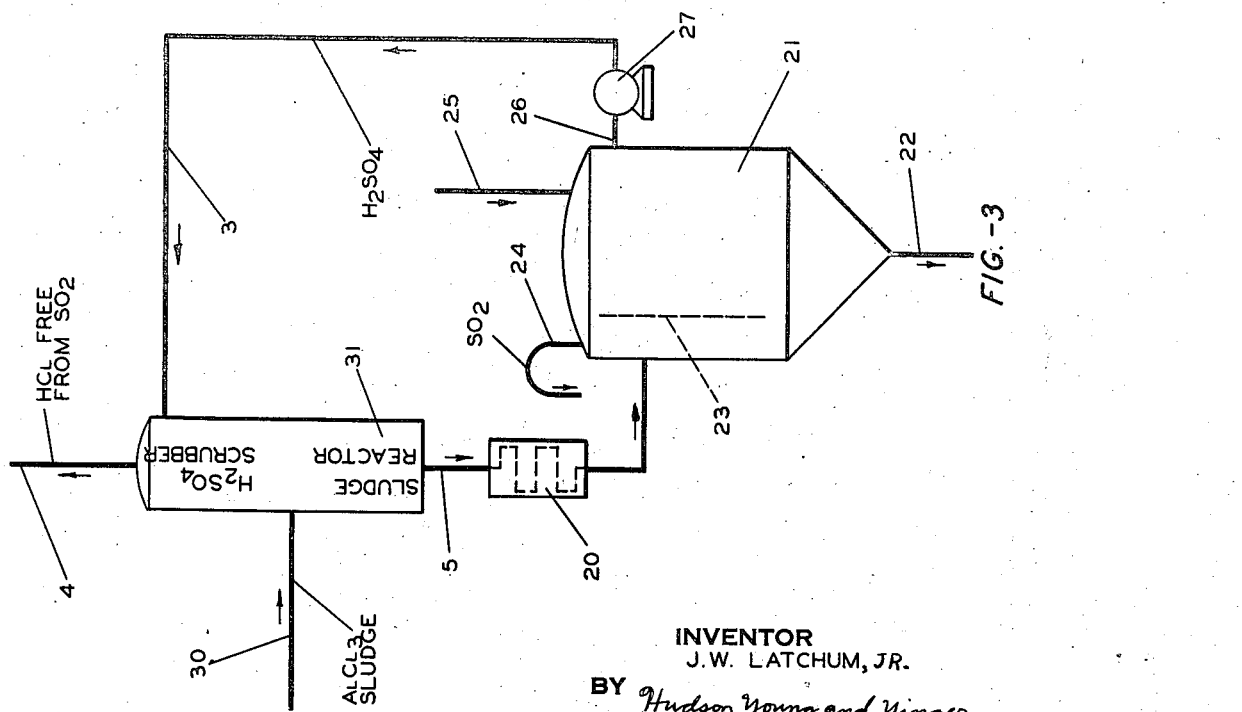
INVENTOR
J.W. LATCHUM, JR.
BY *Hudson, Young and Yinger*
ATTORNEYS Patented Feb. 18, 1947

2,416,011

UNITED STATES PATENT OFFICE 2,416,011

RECOVERY OF SULPHUR DIOXIDE-FREE HYDROCHLORIC ACID FROM ALUMINUM CHLORIDE SLUDGE

John W. Latchum, Jr., Bartlesville, Okla., assignor to Phillips Petroleum Company, a corporation of Delaware Application January 3, 1944, Serial No. 516,885

1 Claim. (Cl. 23—154)

This invention relates to the removal of sulfur dioxide from hydrogen chloride and more particularly to the removal of sulfur dioxide by treatment applied in conjunction with the formation of the hydrogen chloride by reaction of a metal chloride or metal chloride-containing material with sulfuric acid. Thus the present invention may be applied as a part of the process of making hydrogen chloride by the reaction of aluminum chloride or aluminum chloride sludge or sodium chloride or other metal chloride with sulfuric acid in which process as conventionally practiced the hydrogen chloride is contaminated with sulfur dioxide. Likewise, the invention is applicable to effect purification of sulfur dioxide-contaminated hydrogen chloride already prepared by any method.

The principal object of the present invention is to provide an improved method of removing sulfur dioxide from hydrogen chloride. Another object is to provide such a method applied to substantially anhydrous hydrogen chloride in either vapor or liquid form. Another object is to provide an improved method of preparing hydrogen chloride free from sulfur dioxide. Another object is to provide an improved method of preparing anhydrous hydrogen chloride free from sulfur dioxide. Another object is to provide a method which accomplishes the foregoing objects in a simple and economical manner involving a minimum of equipment and attention. Another object is to provide a sulfur dioxide-removal step particularly applicable to the vaporous aluminum chloride-containing effluent resulting from the isomerization of normal butane by means of aluminum chloride and hydrogen chloride. Another object is to provide a process of the foregoing type particularly applicable to the production of hydrogen chloride from aluminum chloride sludge. Numerous other objects will hereinafter appear.

In the drawings:

Figure 3 illustrates the application of the invention to effect preparation and simultaneous purification of hydrogen chloride from aluminum chloride sludge.

Figure 4 illustrates another mode of application of the invention to aluminum chloride sludge.

Figure 2:
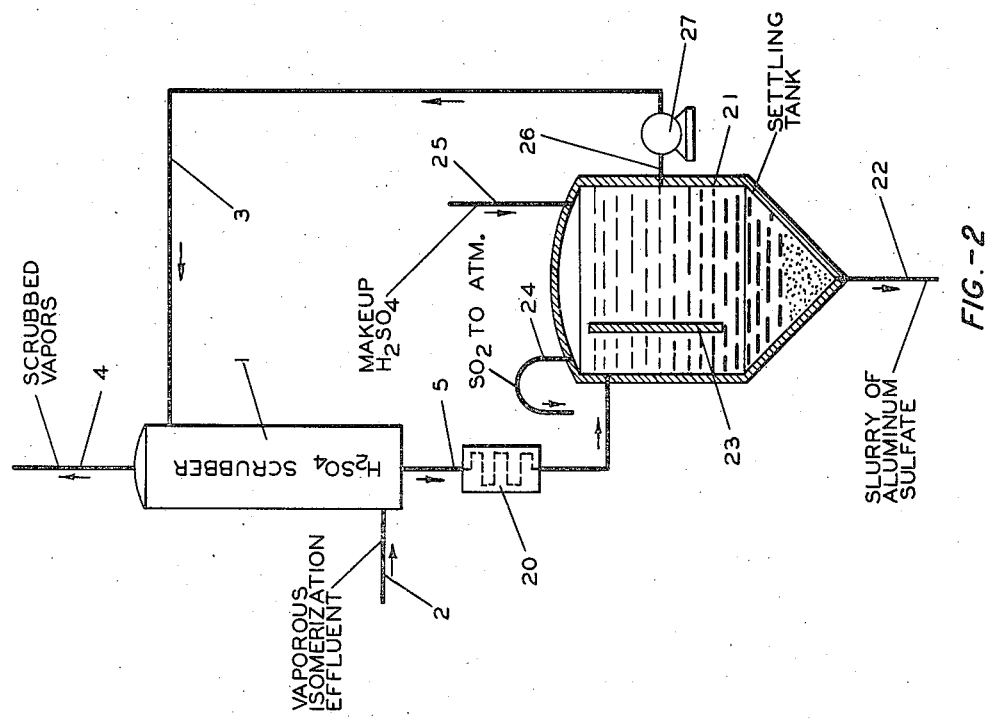
Figure 2 shows one way in which the invention can be applied to the preparation and simultaneous purification of hydrogen chloride in the scrubbing of a vaporous isomerization effluent containing aluminum chloride with sulfuric acid.

Hydrogen chloride as commonly prepared may contain varying amounts of sulfur dioxide as an impurity which is commonly deemed objectionable. Usually this sulfur dioxide impurity is attributable to the method of preparation. Sulfur dioxide is almost invariably produced in small amounts as a result of side reactions, especially when sulfuric acid is used in the production of the hydrogen chloride. Sulfuric acid is most commonly used in making hydrogen chloride in synthesizing it from a metal chloride or metal chloride-containing material, such as the most commonly used sodium chloride or aluminum chloride or aluminum chloride sludge. Use of the latter material as a source of hydrogen chloride is disclosed per se in my copending application, Serial Number 516,318, filed December 30, 1943.

Sulfur dioxide is often formed in this process depending upon the nature of the metallic equipment and the particular conditions of the treatment. Where sulfur dioxide is so formed, it contaminates the hydrogen chloride product.

The mechanism underlying the formation of sulfur dioxide when sulfuric acid is used to liberate hydrogen chloride from a metal chloride or to dehydrate aqueous hydrochloric acid is not clearly understood. While it is not desired to be limited to any theory with respect to this phenomenon, it is known that the formation of sulfur dioxide represents a destruction of a corresponding amount of sulfuric acid and it is believed that it results from a side reaction whereby sulfuric acid is reduced perhaps by the metal of the vessel or of the chloride.

My invention is applicable to hydrogen chloride contaminated with sulfur dioxide in any manner and is not limited to contamination with sulfur dioxide from sulfuric acid. Thus certain processes of making HCl use $SO_2$ as a raw material and my process is applicable to the resulting hydrogen chloride.

While my invention is most conveniently applied to substantially or completely anhydrous hydrogen chloride, it may be applied to hydrogen chloride containing substantial amounts of water in which case it may be so practiced as to effect simultaneous dehydration and removal of sulfur dioxide.

The invention may be applied to hydrogen chloride in either vapor or liquid form.

In accordance with the present invention sulfur dioxide is removed from hydrogen chloride by intimately contacting the hydrogen chloride containing sulfur dioxide with concentrated sulfuric acid. I have found that concentrated sulfuric acid is an excellent solvent for sulfur dioxide which it dissolves in preference to hydrogen chloride. By contacting the hydrogen chloride with sulfuric acid in proper amount and of proper concentration and freedom from sulfur dioxide and then separating the sulfuric acid containing the dissolved sulfur dioxide, there is obtained hydrogen chloride free from appreciable amounts of sulfur dioxide.

While the acid strength may range as low as 70 per cent, it is preferred to use sulfuric acid of a concentration of at least 85 per cent by weight and more preferably at least 90 per cent by weight. The more concentrated the acid, the more effectively it dissolves the sulfur dioxide so that the hydrogen chloride is more free from sulfur dioxide. Another advantage of the use of highly concentrated acid is that the hydrogen chloride product is thereby rendered more free from water. If the concentration of acid drops below 85 per cent satisfactory results are often not attained. The acid strength may vary from 85 to 100 per cent. Since 100 per cent acid is not ordinarily available commercially, I usually do not use acid stronger than 98 per cent.

The temperature at which the extraction of sulfur dioxide from hydrogen chloride is carried out may vary within wide limits, say from the lowest temperature at which the sulfuric acid remains in liquid phase to a point at which the amount of sulfuric acid vaporized and thereby left in the treated hydrogen chloride becomes excessive. Sulfuric acid is an objectionable impurity in hydrogen chloride and the amount thereof present should be limited to traces. Furthermore the decline in solvent power of sulfuric acid for sulfur dioxide with increasing temperature imposes a further practical limitation on the treating temperature, since otherwise objectionably high amounts of sulfur dioxide will be left undissolved in the treated hydrogen chloride. The solubility of $SO_2$ in 90.8 per cent $H_2SO_4$ is as follows: 3.075 gms. per 100 gms. acid at 73.5° F., 1.523 at 122° F., 0.436 at 212° F., 0.171 at 302° F., and 0.053 at 392° F. The extraction is preferably conducted at temperatures of at least 80° F. and more preferably 125° F., but not exceeding 300° F. Since the solubility of HCl in concentrated sulfuric acid decreases with increasing temperatures, it is preferred to use moderately elevated temperatures, here again a compromise being necessary to give a temperature at which sulfuric acid contamination of the hydrogen chloride and loss of HCl in the extraction acid are kept at desirably low figures.

The pressure at which the extraction of the present invention is conducted may vary widely from subatmospheric to highly superatmospheric pressure. Ordinarily pressures ranging from atmospheric, or just sufficiently thereabove to overcome the pressure drop, up to moderately superatmospheric are preferred. Depending upon the pressure and temperature, the hydrogen chloride will be in either vapor or liquid phase.

The sulfuric acid employed as scrubbing or extraction medium in accordance with the present invention is, of course, itself sufficiently free from sulfur dioxide to accomplish the desired removal.

Countercurrent movement of the hydrogen chloride and sulfuric acid extractant is ordinarily preferred.

The degree of sulfur dioxide removal is preferably such that the hydrogen chloride product is free from detectable amounts of sulfur dioxide. Substantial freedom from sulfur dioxide, i. e. freedom from $SO_2$ in amounts greater than 0.5 per cent, may be sufficient in some cases. In general, however, the hydrogen chloride should not contain more than 0.05 weight per cent of sulfur dioxide, which represents about the maximum in hydrogen chloride used as a promoter for aluminum chloride-catalyzed hydrocarbon conversions. While it is not at present known with certainty that sulfur dioxide will poison the aluminum chloride catalyst, its presence is commonly deemed objectionable.

In the light of the foregoing, those skilled in the art will be readily enabled to carry out the process of the present invention and select suitable operating conditions including sulfuric acid concentration and amount, temperature, pressure, etc. It will be seen that my invention involves the unique discovery that concentrated sulfuric acid dissolves readily and removes sulfur dioxide, yet is virtually a non-solvent for hydrogen chloride, especially anhydrous hydrogen chloride. The solubility of anhydrous HCl gas in sulfuric acid of strengths ranging from 80 to 100 per cent is negligible and is very small even at acid strengths as low as 70 per cent.

The process of the present invention may be readily applied to the sulfuric acid extraction of the aluminum chloride-containing effluent resulting from the isomerization of normal butane to isobutane by means of aluminum chloride and hydrogen chloride. It is now known that the sulfuric acid removes the aluminum chloride from such an effluent by converting same to hydrogen chloride and aluminum sulfate. This constitutes the subject matter of my copending application, Serial No. 460,858, filed October 5, 1942. But it has not been disclosed heretofore that, during the course of this reaction, still another reaction proceeds generating $SO_2$. This side reaction appears to be at its minimum at about 150° F. and gradually increases with increase in temperature although still constituting a very minor portion of the total reaction at temperatures as high as 250° F. I have found that this sulfur dioxide is very easily removed from the treated effluent (which contains both the HCl in the incoming effluent and that generated by the reaction with sulfuric acid) by increasing the circulation of concentrated sulfuric acid through the vapor or liquid phase treating chamber to such an extent that sufficient $H_2SO_4$ is present to pick up all evolved $SO_2$ from the effluent treatment. The $SO_2$ so dissolved may be substantially completely removed by heating and/or flashing to lower pressures so that $H_2SO_4$ undersaturated with respect to $SO_2$ and preferably essentially free from $SO_2$, is obtained and can be recirculated to the treating zone.

The invention may be applied in a similar manner to the reaction of aluminum chloride-containing sludge with sulfuric acid to convert the aluminum chloride to hydrogen chloride. In such case the sludge may be introduced into the middle of a combined reactor and scrubber, the upper part serving to scrub free of sulfur dioxide the hydrogen chloride generated in the bottom part.

Figure 1:
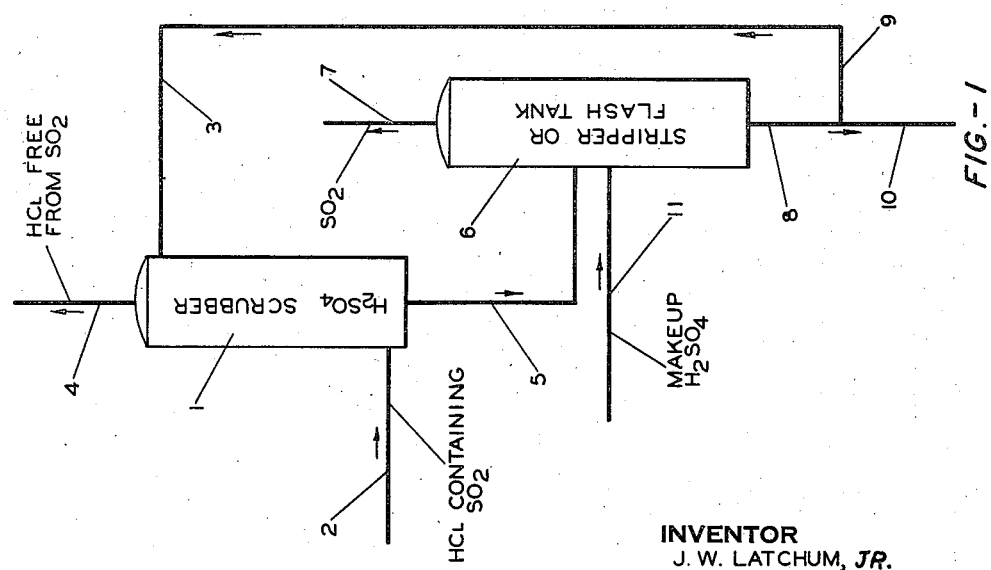
Figure 1 illustrates the invention as it may be applied in the purification of hydrogen chloride already prepared by any method.

In Figure 1 of the drawings, hydrogen chloride containing $SO_2$ and derived from any source and in either liquid or gaseous phase enters scrubber 1 via line 2 and is scrubbed countercurrently therein with concentrated sulfuric acid introduced by line 3. The scrubber 1 is provided with any suitable means for giving intimate contact such as packing or plates. The treated HCl leaves via line 4. The acid containing dissolved $SO_2$ leaves via line 5 and passes into stripper or flash tank 6 where the dissolved $SO_2$ is driven off by heating or reduction of pressure, or both, leaving via line 7. The regenerated acid leaves via line 8 and a portion thereof is recycled via lines 9 and 3, while the balance may be discarded via line 10. The discard may be taken off from line 5 instead. Fresh $H_2SO_4$ may be added at any suitable point as via line 11.

In Figure 2 the vaporous $AlCl_3$-containing isomerization effluent passes via line 2 into scrubber 1. Sulfuric acid of suitable strength is fed in via line 3 in amount and concentration and at a temperature such that the scrubbed vapors of normal butane, isobutane and hydrogen chloride are free not only from aluminum chloride and water, but also from sulfur dioxide. The acid leaving via line 5 is usually at an elevated temperature since the effluent entering via line 2 is usually in vaporous form. The acid after cooling in cooler 20, passes to settler 21 wherein a slurry of the aluminum sulfate in sulfuric acid separates and is withdrawn via line 22. Vessel 21 may be provided with baffle 23. The $SO_2$ which separates may be vented to the atmosphere by line 24. Settler 21 is conveniently maintained at atmospheric pressure. Since scrubber 1 is commonly at high pressure, known means is provided such as a motor valve in line 5 for feeding the acid to tank 21 while maintaining the pressure in scrubber 1. Makeup acid is added to tank 21 via line 25. The supernatant acid layer is withdrawn via line 26 and recycled via pump 27 and line 3.

In Figure 3, aluminum chloride sludge passes via line 30 into reactor-scrubber 31. In the bottom of unit 31 the acid descending from the upper portion reacts with the sludge to give off HCl which passes into the upper part which is preferably packed or provided with other suitable means for attaining intimate contact. The resulting acid mixture is passed to a tank 21 as in Figure 2, operation of which is the same as in Figure 2.

In Figure 4, operation is much as in Figure 3 but the scrubber and reactor are separated, the sludge being fed via line 41 to reaction tank 42. Strong $H_2SO_4$ low in or free from $SO_2$ enters scrubber 43 via line 44 and the resulting acid passes via line 45 into tank 42. The reaction mixture formed in tank 42 is withdrawn via line 46 and may be passed to an $SO_2$ and aluminum sulfate separation step similar to that of Figures 2 and 3. The gaseous mixture of HCl and $SO_2$ passes via line 47 into the bottom of scrubber 43. If desired, instead of using the spent $SO_2$-containing acid leaving the bottom of scrubber 43 as the acid in reactor 42, this spent acid may be passed to a stripping and/or flashing step similar to that of Figure 1 for the regeneration of the acid by removal of the dissolved $SO_2$ content and sulfuric acid from another source fed into unit 42.

From the foregoing it will be seen that the present invention provides a highly advantageous method of removing sulfur dioxide from hydrogen chloride. This result is accomplished in a simple and economical manner. The loss of hydrogen chloride is extremely low. The contamination of the hydrogen chloride product with water and sulfuric acid is prevented. The treating reagent—sulfuric acid—is cheap and readily available. When the process of this invention is applied in conjunction with the preparation of anhydrous hydrogen chloride by reaction of a metal chloride with sulfuric acid or dehydration of aqueous hydrochloric acid with sulfuric acid, the invention enables production of a hydrogen chloride product which is much lower in sulfur dioxide than that obtained in the conventional practice of such processes. The invention enables, by the use of a sufficiently large amount of sulfuric acid of a sufficient concentration, at a proper temperature in a countercurrent treating process, the preparation of anhydrous hydrogen chloride free from sulfur dioxide. Numerous other advantages will be apparent to those skilled in the art.

I claim:

The process of preparing sulfur dioxide-free anhydrous hydrogen chloride from aluminum chloride sludge which comprises reacting in a reaction zone said sludge with concentrated sulfuric acid resulting from the scrubbing step hereinafter identified and thereby forming gaseous hydrogen chloride contaminated with sulfur dioxide generated as a by-product in the reaction, scrubbing said gaseous hydrogen chloride contaminated with sulfur dioxide in a scrubbing zone separate from said reaction zone by contacting said gaseous hydrogen chloride intimately and countercurrently with concentrated sulfuric acid of a strength of at least 85 per cent by weight under conditions such that the sulfuric acid dissolves substantially all of the sulfur dioxide from the hydrogen chloride giving a sulfur dioxide-free anhydrous hydrogen chloride product, passing the sulfur dioxide-containing sulfuric acid resulting from said scrubbing step to said reacting step and employing same as the acid therein, passing the residual acid mixture resulting from said reaction to a combined sulfur dioxide removal and aluminum sulfate separation zone separate from said reaction zone and there separating concentrated sulfuric acid free from aluminum sulfate and sulfur dioxide by settling of aluminum sulfate and by at least one of reduction of pressure and heating, withdrawing from said last-named zone said concentrated sulfuric acid free from aluminum sulfate and sulfur dioxide and recycling same to said scrubbing step as the concentrated sulfuric acid used therein.

JOHN W. LATCHUM, Jr.

REFERENCES CITED

The following references are of record in the file of this patent:

UNITED STATES PATENTS

| Number | Name | Date |
| --- | --- | --- |
| 2,301,779 | Herold et al. | Nov. 10, 1942 |
| 2,165,784 | Burrage | July 11, 1939 |
| 1,865,797 | Shiffler | July 5, 1932 |
| 1,277,329 | McAfee | Aug. 27, 1918 |
| 2,206,528 | Corey | July 2, 1940 |
| 2,365,917 | Tyomas | Dec. 26, 1944 |
| 2,316,633 | C. H. Smith | Apr. 13, 1943 |
| 2,351,461 | D. A. Smith | June 13, 1944 |

OTHER REFERENCES

Babor, et al., "General College Chemistry," page 319, Thomas V. Crowell Co., New York (1940). (Copy in Div. 59.)